(No Model.) 2 Sheets—Sheet 2.
C. G. BURKE.
TELEGRAPHIC INSTRUMENT.
No. 460,111. Patented Sept. 29, 1891.
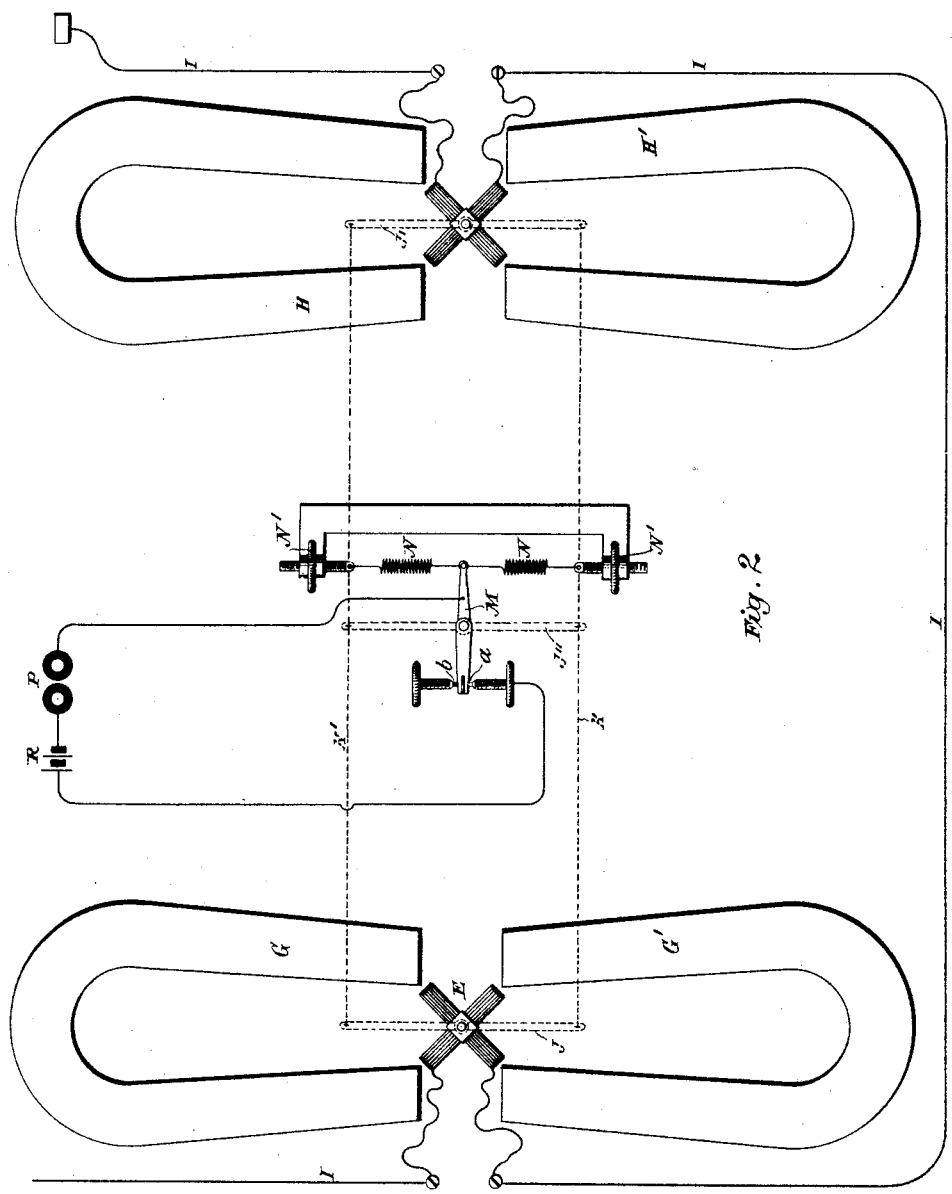
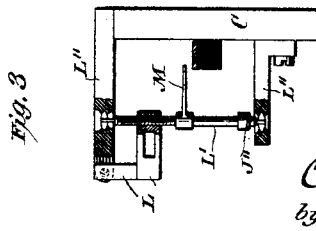
Witnesses:
Raphael Netter
Frank D. Murphy.
Inventor
Chas G. Burke
by Duncan & Page
Attorneys.

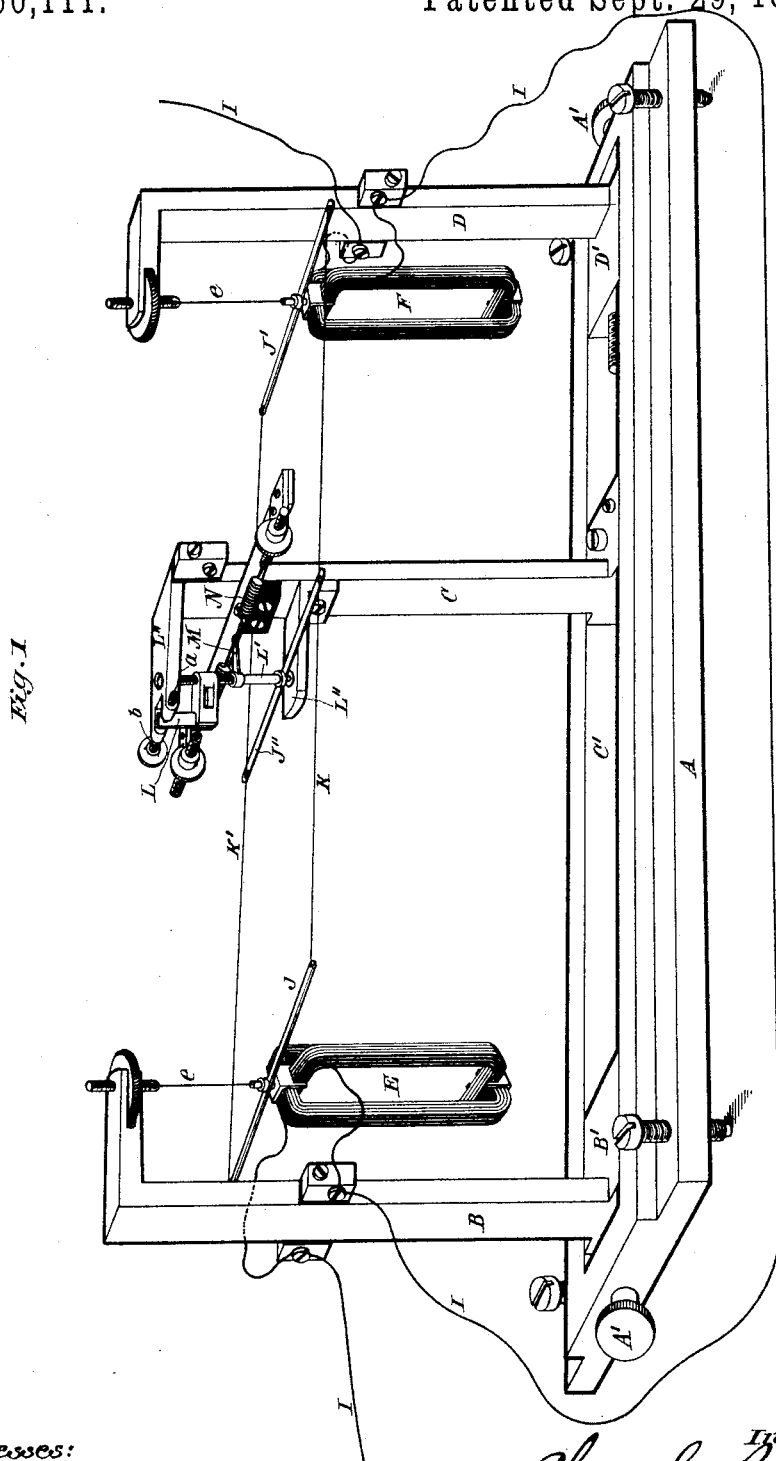

UNITED STATES PATENT OFFICE.

CHARLES G. BURKE, OF RICHMOND HILL, NEW YORK.

TELEGRAPHIC INSTRUMENT.

SPECIFICATION forming part of Letters Patent No. 460,111, dated September 29, 1891.

Application filed February 11, 1891. Serial No. 381,085. (No model.)

*To all whom it may concern:*

Be it known that I, CHARLES G. BURKE, a citizen of the United States, residing at Richmond Hill, in the county of Queens and State of New York, have invented certain new and useful Improvements in Telegraphic Instruments, of which the following is a specification, reference being had to the drawings accompanying and forming a part of the same.

The subject of my present application is an improvement in receiving-instruments for telegraphic circuits, more especially those of great length, such as submarine cables, in which instruments of great sensitiveness are required.

The object of the invention is to produce a receiving instrument or relay that will respond rapidly and accurately to the signaling-currents which it is necessary to use in such circuits to secure good results, and which will yield or produce a clear and distinct record or succession of signals.

In carrying out my invention I prefer to use as the element of the relay that responds to the variations or impulses of the line-current a magnetic system invented by me and described in detail herein; but I may use others, as will be understood from the complete description of the nature of the invention.

The improved magnetic system above referred to, the principle of which I have shown and described in an application which was filed by me December 26, 1889, Serial No. 334,978, is as follows: Two coils of fine wire are wound and secured together at practically right angles and supported so as to turn in a magnetic field about a vertical axis. The magnetic field in which these coils are supported is produced by four poles, preferably those of two permanent magnets, placed with like poles opposite to each other. The normal position of the coils with reference to these poles is that in which opposite sides of each coil are in close proximity to opposite poles or poles of unlike sign, so that each coil lies obliquely across the field from a north to a south pole. The direction of winding or order of connections is such that a current impulse through the two coils passes through each in the same direction. In applying a device of this or similar construction to my present invention I duplicate the coils and fields—that is to say, I use two pairs of coils and two sets of field-magnets and mount independently of the coils a recording or contact-making device to which both pairs of coils are connected and which both co-operate to move when influenced by a line-current or any variation therein.

In other respects the invention involves the special manner of connecting the coils to the contact device, a new form of shifting zero, and other features of construction, the nature of which will be described in detail by reference to the accompanying drawings.

Figure 1 is a perspective view of my improved instrument adapted for use as a relay, but without the field-magnets. Fig. 2 is a plan view of the same partly diagrammatic, and Fig. 3 is a sectional detail of the contact mechanism.

A is a suitable base in which are mounted three standards B C D, two of which are adjustable with respect to the base, a convenient plan for this being to set the standards in feet B' D', which are moved in a slot C' by means of screws A'. From each standard B D is suspended a pair of coils E and F by means of filar supports $e$. The two coils of each pair are of fine wire, are secured at right angles to each other, and are placed in magnetic fields produced by permanent or other magnets G G' H H'. These magnets are arranged with respect to the coils in the manner above described—that is to say, the opposite sides of each coil are in close proximity to opposite poles, the coils lying obliquely across the field from the north pole of one magnet to the south pole of the other. The lower ends of the coils— and for convenience each pair of coils will be hereinafter referred to as constituting a single coil, unless otherwise indicated—are free to swing, the usual filar connection from these ends being dispensed with, and they are preferably connected together in series in the line-circuit I in such order that in their movements, under the influence of the line-currents, they tend to preserve their parallelism. To the coils E F are attached light bars J J', placed parallel to each other, and the ends of said bars are connected by fine inelastic threads K K'. Between the two coils and sets of magnets is the recording or signaling mechanism. This may be of any proper character; but I shall confine the description in the present case to a contact device constituting a relay for Morse signals.

L is a contact tongue or arm which is carried by a vertical spindle L', mounted so as to turn with the utmost freedom in two horizontal arms L'' L'', extending from the standard C. The arm L is adapted to vibrate between two stops, one $a$ of metal, the other $b$ of vulcanite or insulated. An arm M is fixed to the spindle L', and to it are connected the two springs N N, that are adjusted by means of screws N' N'. To the spindle L' is also fixed a bar J'', to the ends of which the threads K K', respectively, are made fast.

A peculiar and important feature of the invention is the connection between the contact-arm L and the spindle L'. The latter turns freely on the spindle, thus constituting what is known as the "movable or shifting zero principle;" but in lieu of the ordinary frictional connection I cut screw-threads on the spindle and in the perforation of the arm L, so that a movement of the spindle in either direction after the arm L has come in contact with either stop $a$ or $b$ makes a rubbing contact between the spindle and the arm and between the contact-surfaces of the arm and stop, the last-named effect being due to the vertical movement of the arm L on the spindle L'.

The arm M and the stop $a$ are the terminals of a local circuit containing, say, a sounder P and battery R, and this latter is operated each time that the arm is shifted into contact with the stop $a$. This will occur in consequence of every rise of potential following a drop in the main line, for the coils E F, being traversed by the main-line current, will be turned more or less by each impulse or rise and acting in conjunction upon the bar J'', through the threads K K', will impart corresponding movements to the spindle L'.

I have found in the practical operation of this instrument that it is desirable to adjust the springs N N so that the arm L is nearly balanced between the two stops, under which circumstances the instrument works with great accuracy and responds to extremely slight currents or variations therein.

Having now described my invention, what I claim is—

1. The combination, with two coils mounted or supported by independent terminal supports, independent magnetic fields in which said coils are mounted and free to turn, the coils being connected with a signaling or cable circuit and adapted to turn in the magnetic fields in the same direction, of a recording or signaling mechanism and flexible connections between the movable parts thereof and each of the coils, whereby both the latter co-operate in the operation of the same, as set forth.

2. The combination, with two coils and two magnetic fields in which said coils are mounted and adapted to turn in the same direction when traversed by the signaling-currents, of a contact-arm, a bar or lever at right angles to the axis or shaft of said arm, bars carried by the coils, and connections between the same and the bar moving the contact-arm, as set forth.

3. The combination, with two pairs of coils, the coils of each pair being secured at right angles and movable in fields of force produced by four magnetic poles, of which those in proximity to the opposite sides of the same coil of each pair are of unlike polarity, of a recording or contact lever and connections between the same and the coils, whereby movements of said coils in response to signaling-currents impart corresponding movements to the contact-arm, as set forth.

4. The combination, with two suspended coils movable in magnetic fields and having their lower ends free, of a contact-lever between the two coils, bars or arms extending from the axis of the contact-lever and each coil, and threads connecting the same with one another, as set forth.

5. The combination, with two freely-suspended coils movable in independent magnetic fields, and bars attached to said coils, of a vibrating contact or recording arm connected by threads to the said bars, and means for adjusting each coil to and from the contact-arm, as set forth.

6. A shifting or movable zero contact-arm composed of a screw-threaded spindle or part adapted to be turned in response to signaling currents or impulses, in combination with an arm or lever having the part engaging or surrounding the spindle threaded, and limiting or contact stops between which said arm vibrates, as set forth.

7. The combination, in a telegraphic receiving-instrument, with stops, as $a\,b$, of a contact-arm, as L, and a screw-threaded spindle or part movable in response to current impulses and upon which the arm L is mounted, as described.

8. The combination, with the spindle L', the arm L, turning freely thereon, the stops, as $a\,b$, the arm M, extending from the spindle, and the springs for adjusting the position of said spindle, of the bar J'', attached to the spindle, the movable coils E F, the bars J and J', carried by the coils, and the threads K K', connected to the ends of all the bars, as and for the purpose set forth.

CHARLES G. BURKE.

Witnesses:
ROBT. F. GAYLORD,
PARKER W. PAGE.